3,772,369
PURIFICATION OF HEXAMETHYLENEDIAMINE
Kenji Nishimura, Kanenobu Matsui, and Koichi Hirai, Ube, Japan, assignors to Ube Industries, Ltd., Yamaguchi-ken, Japan
No Drawing. Filed Nov. 24, 1971, Ser. No. 201,996
Claims priority, application Japan, Dec. 11, 1970, 45/109,342
Int. Cl. C07c 87/14
U.S. Cl. 260—583 N                                                      6 Claims

ABSTRACT OF THE DISCLOSURE

A crude hexamethylenediamine is purified by treating the crude hexamethylenediamine with periodic acid or its salts and thereafter, distilling the treated crude hexamethylenediamine, whereby 1,2-diaminocyclohexane is removed from the crude hexamethylenediamine.

---

The present invention relates to a process of the purification of hexamethylenediamine, more particularly, relates to a process of the preparation of pure hexamethylenediamine free from 1,2-diaminocyclohexane.

The term "1,2-diaminocyclohexane" used herein includes cis- and/or trans-1,2-diaminocyclohexanes.

It is well-known that hexamethylenediamine is a valuable intermediate useful in the production of condensation products such as polyamides. The hexamethylenediamine is produced by the catalytical hydrogenation of adiponitrile, 1,4-dicyanobutene or ε-aminocapronitrile. Most of the crude hexamethylenediamine thus produced contains small quantities of impurities such as 1,2-diaminocyclohexane including cis- and/or trans-compounds, ammonia, hexamethyleneimine, ε-aminocapronitrile and Schiff bases. Particularly, it is known that the crude hexamethylenediamine usually contains 600 to 2,000 p.p.m. of 1,2-diaminocyclohexane.

Especially, in order to obtain high quality polyamide, it is strongly required that the hexamethylenediamine is completely free from the 1,2-diaminocyclohexane. This is due to the fact that the 1,2-diaminocyclohexane in the hexamethylenediamine affects the physical and chemical properties of the resultant polyamide and results in bad color and poor dyeability of the polyamide even when the amount of the 1,2-diaminocyclohexane is very small.

In the prior art, the 1,2-diaminocyclohexane has been removed from the crude hexamethylenediamine by multi-fractional distillation.

For example, U.S. Pat. No. 2,802,030 provides a process of distilling the hexamethylenediamine by fractionating columns including a large number of plates e.g. 40, in order to remove the 1,2-diaminocyclohexane. However, it is very difficult to remove the 1,2-diaminocyclohexane from the crude hexamethylenediamine by way of the conventional distillation because of the closeness of the boiling points of the hexamethylenediamine and of cis- and trans-1,2-diaminocyclohexane associated with the hexamethylenediamine. In fact, even when the crude hexamethylenediamine has been distilled in fractionating columns having 40 plates, the resultant hexamethylenediamine still contains 100 to 200 p.p.m. of 1,2-diaminocyclohexane. Moreover, the conventional multi-fractional distillation results in a loss of a certain amount of the hexamethylenediamine and is very expensive.

Another process for removing the 1,2-diaminocyclohexane from the crude hexamethylenediamine is effected, by contacting nickel sulfate or copper sulfate with the crude hexamethylenediamine so as to precipitate an insoluble chelate of the 1,2-diaminocyclohexane and then separating the insoluble chelate from the hexamethylenediamine, as disclosed in U.S. Pat. No. 3,254,126.

With this process it is difficult to substantially completely remove the 1,2-diaminocyclohexane from the crude hexamethylenediamine and there is a large variation of the removal efficiency.

Further, it is known that the 1,2-diaminocyclohexane can be removed from the crude hexamethylenediamine by a process in which the crude hexamethylenediamine is recrystallized from water as disclosed in British Pat. No. 1,147,458 or a process in which the crude hexamethylenediamine is recrystallized from a hydrocarbon having 5 to 12 carbon atoms such as cyclohexane, as disclosed in U.S. Pat. No. 3,510,522.

Still further, it is known that the 1,2-diaminocyclohexane can be separated from crude hexamethylenediamine by treating the crude hexamethylenediamine with adipic acid in isopropyl alcohol so as to convert the hexamethylenediamine to an adipate thereof, and recrystallizing the adipate from isopropyl alcohol, as illustrated in Japanese patent publication No. 45/849 (1970).

The recrystallization purification of the hexamethylenediamine includes various disadvantages such as complication of the process, loss of a certain amount of the hexamethylenediamine into the solvent and the loss of a certain amount of the solvent. Accordingly, a recrystallization purification is unsatisfactory for commercial production.

It is, therefore, one object of the present invention to provide a process of purifying hexamethylenediamine from 1,2-diaminocyclohexane in a high degree of efficiency.

It has been found that crude hexamethylenediamine containing 1,2-diaminocyclohexane can be effectively and economically purified by treating the crude hexamethylenediamine with a treating agent selected from the group consisting of periodic acid, its salts and mixtures of two or more of these compounds at room temperature or at a slightly higher temperature little higher and distilling the treated crude hexamethylenediamine.

The agent for treating the crude hexamethylenediamine may be selected from the group consisting of periodic acid, its salt such as potassium, sodium or ammonium periodate, and mixtures of two or more of the above components.

Additionally, it has been found that iodic acid and its salts are ineffective for the purification of the hexamethylenediamine. However, the purification effect of the iodic acid and its salts is much lower than that of the periodic acid and its salts, and therefore, they are invaluable in practice.

In order to completely decompose and remove the 1,2-diaminocyclohexane from the crude hexamethylenediamine, it is preferable that the treating agent is applied to the crude hexamethylenediamine in a mol ratio of 0.8 to 1.3 of the treating agent to the 1,2-diaminocyclohexane.

The quantity of the treating agent to be applied to the crude hexamethylenediamine depends on the proportion of the contents of cis- and trans-1,2-diaminocyclohexane.

In the case where the 1,2-diaminocyclohexane consists of the cis-form only, the treating agent is applied in a relatively low mol ratio, because the cis-form has a reactivity higher than that of the trans-form. In this case, it is preferable that the treating agent is applied in a mol ratio of approximately 0.8 or more for the decomposition of the cis-1,2-diaminocyclohexane. In the case where the 1,2-diaminocyclohexane consists of the trans-form only, it is preferable that the treating agent is applied in a mol ratio of approximately 1.3 or less because the trans-form has a relatively low reactivity. In the case where the 1,2-diaminocycloxane is a mixture of the cis- and trans-forms, the treating agent may be applied in a mol ratio between 0.8 to 1.3 depending on the mixing ratio of the cis-form to the trans-form.

However, the present invention is not limited to the above mol ratio, and even when the process of the present invention is effected in a mol ratio less than 0.8, for example, a mole ratio of 0.5, the hexamethylenediamine can be remarkably purified from 1,2-diaminocyclohexane. However, it is undesirable that the treating agent is used in a mol ratio greatly in excess of 1.3 because such excess of the treating agent results in the formation of new impurities and is expensive.

If the crude hexamethylenediamine includes impurities other than 1,2-diaminocyclohexane, these impurities undesirably react with the treating agent which is added only in order to react with the 1,2-diaminocyclohexane. Accordingly, in this case, it is necessary that the treating agent is added to the crude hexamethylenediamine in a mol ratio in excess of that necessary for the 1,2-diaminocyclohexane by an amount depending on the amount of the other impurities. However, since the impurities other than the 1,2-diaminocyclohexane generally have a boiling point higher than that of the hexamethylenediamine, it is economically desirable if the impurities having a high boiling point are previously removed from the crude hexamethylenediamine by way of a simple distillation before the process of the present invention applied to the distilled crude hexamethylenediamine.

In order to bring the treating agent uniformly in contact with the 1,2-diaminocyclohexane contained in the crude hexamethylenediamine, the treatment is generally carried out in an aqueous solution of the crude hexamethylenediamine with stirring. In this case, it is preferable that the aqueous solution contains 40 to 60% by weight of the crude hexamethylenediamine. The temperature at which the treatment is carried out is preferably within a range from 20 to 40° C.

In order to accelerate the decomposition of the 1,2-diaminocyclohexane in the crude hexamethylenediamine, the aqueous solution may be heated up to a temperature of 70° C. Generally, however since the reaction of the treating agent with the 1,2-diaminocyclohexane in the aqueous solution can be effected even at room temperature, it is unnecessary to heat the aqueous solution. The treatment is preferably carried out for several minutes up to about 20 to 30 minutes, more preferably, for 10 to 20 minutes.

The crude hexamethylenediamine thus treated is further refined by distilling it so as to obtain pure hexamethylenediamine. The distillation may be carried out in the conventional distillation apparatus. In order to prevent heat-deterioration of the hexamethylenediamine during the distillation, it is preferable to distill the crude hexamethylenediamine under reduced pressure conditions, for example, 35 to 120 mm. Hg at a temperature of 110 to 140° C.

Through the process of the present invention detailed above, the 1,2-diaminocyclohexane contained in the crude hexamethylenediamine can be substantially completely decomposed and removed from the crude hexamethylenediamine. However, sometimes, by-products are produced in a very small quantity during the process of the present invention. These by-products can be detected by polarography in which the reduction wave at a potential of $-1.3$ to $-1.5$ volts is measured and/or by ultraviolet spectrophotometry in which absorbance at a wave length of approximately 240 m$\mu$ is measured. The same compounds as the by-products are also contained more or less in the original crude hexamethylenediamine.

In order to suppress the formation of the reducing compound and to remove it, it is most suitable for the distillation of the crude hexamethylenediamine to be carried out in the presence of a small amount of caustic alkali in accordance with the conventional method.

When the crude hexamethylenediamine is subjected to the process of the present invention, it is possible to decrease the 1,2-diaminocyclohexane to a concentration of 20 p.p.m. which value is the sensitivity limit of detection by polarographic analysis.

In order to clearly understand the process of the present invention, the following specific examples are appended which are intended to be illustrative only and not limitative.

EXAMPLE 1

A crude hexamethylenediamine was prepared by catalytically hydrogenating adiponitrile in the presence of ammonia and thereafter, by simple-distilling it in order to remove impurities having a high boiling point. In order to determine the concentration of the 1,2-diaminocyclohexane in the crude hexamethylenediamine, the 1,2-diaminocyclohexane was converted to a cobalt complex. It was determined by polarographic analysis that the crude hexamethylenediamine contained 330 to 350 p.p.m. of 1,2-diaminocyclohexane and 430 p.p.m. of the polarographically reducing compounds calculated in terms of the heptaldehyde. The reducing compounds had a reduction wave at a voltage of $-1.3$ to $-1.5$ under a polarograph using a dropping mercury electrode. An aqueous solution of 5% by weight of the crude hexamethylenediamine had an ultraviolet ray absorbance of 0.220 at 240 m$\mu$ wave length.

Additionally, the concentrations of the 1,2-diaminocyclohexane, the concentrations of the polarographically reducing compounds and the ultraviolet ray absorbance described hereinafter were determined in the same way as stated above.

To ten grams of the crude hexamethylenediamine was added 1.47 ml. of a solution containing 7.32 mg. of potassium periodate in water and then diluted to an aqueous solution of 25 g. by adding water. In this latter aqueous solution, the mol ratio of the potassium periodate to 1,2-diaminocyclohexane was 1.1. The aqueous solution was stirred at a temperature of about 40° C. for 10 minutes, and thereafter, subjected to distillation at a temperature of 110 to 116° C. under a pressure of 40 to 45 mm. Hg. The distilled hexamethylenediamine was collected in a yield of 9.15 g. The distilled hexamethylenediamine contained less than 20 p.p.m. of the 1,2-diaminocyclohexane and 400 to 420 p.p.m. of the polarographically reducing compounds in heptaldehyde equivalent. An aqueous solution containing 5% by weight of the distilled hexamethylenediamine had an ultraviolet ray absorbance of 0.170 at 240 m$\mu$ wave length. It is clear that the content of 1,2-diaminocyclohexane in the hexamethylenediamine was remarkably reduced but the concentration of the polarographically reducing compounds and the ultraviolet ray absorbance of the distilled hexamethylenediamine was similar to those of the crude hexamethylenediamine. Subsequently, in order to remove the polarographically reducing impurities, the distilled hexamethylenediamine was dissolved in water in the presence of 356 p.p.m. of caustic potassium, and then distilled once again. The redistilled hexamethylenediamine contained the polarographically reducing impurities in a concentration of 30 to 40 p.p.m. in heptaldehyde equivalent and had an ultraviolet ray absorbance of 0.100. 1,2-diaminocyclohexane could not be detected in the redistilled hexamethylenediamine by the polarograph.

EXAMPLE 2

10 g. of crude hexamethylenediamine containing 542 p.p.m. of cis - 1,2 - diaminocyclohexane and substantially no other impurity was dissolved in water for a 25 g. aqueous solution to which was added 2.67 ml. of a solution of 11.13 mg. of potassium periodate in water. In the aqueous solution, the mol number of the potassium periodate was equal to that of the cis-1,2-diaminocyclohexane. The aqueous solution was agitated at a temperature of approximately 40° C. for 10 minutes and subsequently, distilled at a temperature of 110 to 116° C., under a reduced pressure of 40 to 45 mm. Hg. The distilled hexamethylenediamine was obtained in a yield of 8.80 g. It was observed that the cis - 1,2 - diaminocyclohexane was not detected by the polarograph.

The distilled hexamethylenediamine contained 40 to 60 p.p.m. of the polarographically reducing impurities in heptaldehyde equivalent and had an ultraviolet ray absorbance of 0.433 at 240 mμ wave length.

Further, it was found that the distilled hexamethylenediamine contained iodine compounds in a concentration less than 1 to 2 p.p.m. which value is the detection limit of fluorescent X-ray analysis.

EXAMPLE 3

2.0 ml. of an aqueous solution containing 10.50 mg. of potassium periodate and 5.11 mg. of potassium hydroxide was mixed with 10 g. of crude hexamethylenediamine containing 520 p.p.m. of cis - 1,2 - diaminocyclohexane and substantially no other impurity and then, the mixture was diluted to a 25 g. aqueous solution by further adding water. In the latter aqueous solution, the mol number of the potassium periodate was squal to that of the cis - 1,2 - diaminocyclohexane. The aqueous solution was treated and distilled under a reduced pressure by the same procedure as that of Example 2. The distilled hexamethylene diamine was obtained in a yield of 8.94 g. It was observed that in the purified hexamethylenediamine, that the content of the cis - 1,2 - diaminocyclohexane was lower than the sensitivity limit of the polarographic analysis and the concentration of the polarographically reducing impurities was 20 to 40 p.p.m. in heptaldehyde equivalent, and that the purified hexamethylenediamine has an ultraviolet ray absorbance of 0.060 at 240 mμ wave length.

EXAMPLE 4

2.52 ml. of a solution of 10.50 mg. of potassium periodate in water was mixed with 10 g. of crude hexamethylenediamine containing 520 p.p.m. of cis-1,2-diaminocyclohexane and substantially no other impurity, and thereafter, to the mixture water was added to prepare 18.6 g. of an aqueous solution. The aqueous solution was subjected to the same treatment and distillation under a reduced pressure as in Example 2. A purified hexamethylenediamine was obtained in a yield of 8.99 g. It was observed that in the purified hexamethylenediamine, the content of the cis - 1,2 - diaminocyclohexane was lower than the sensitivity limit of the polarographic analysis and the content of the polarographically reducing impurities was 75 to 95 p.p.m. in heptaldehyde equivalent, and that the purified hexamethylenediamine had an ultraviolet ray absorbance of 0.430 at 240 mμ wave length.

EXAMPLE 5

3.38 ml. of a solution of 14.09 mg. of potassium periodate in water was mixed with 10 g. of crude hexamethylenediamine containing 581 p.p.m. of trans-1,2-diaminocyclohexane and substantially no other impurity, and thereafter, to the mixture, water was added to prepare 25 g. of an aqueous solution. In the aqueous solution, the mol ratio of the potassium periodate to the trans-1,2-diaminocyclohexane was 1.2. The aqueous solution was subjected to the same treatment and distillation under a reduced pressure as in Example 2. A purified hexamethylenediamine was obtained in a yield of 9.04 g. It was observed that in the purified hexamethylenediamine, the content of the cis - 1,2 - diaminocyclohexane was lower than the sensitivity limit of the polarographic analysis and the content of the polarographically reducing impurities was 170 to 190 p.p.m. in heptaldehyde equivalent, and that the purified hexamethylenediamine had an ultraviolet ray absorbance of 0.183 at 240 mμ wave length.

EXAMPLE 6

10 g. of crude hexamethylenediamine containing 520 p.p.m. of cis-1,2-diaminocyclohexane and substantially no other impurity and periodic acid dihydrate of a mol equivalent to the cis-1,2-diaminocyclohexane were dissolved in water. The aqueous solution was treated and distilled under a reduced pressure in the same manner as that of Example 2. A purified hexamethylenediamine was obtained in a yield of 8.98 g. It was observed that in the purified hexamethylenediamine, the content of the cis-1,2-diaminocyclohexane was lower than the sensitivity limit of the polarographic analysis and the content of the polarographically reducing impurities was 550 p.p.m. in heptaldehyde equivalent, and that the purified hexamethylenediamine had an ultraviolet ray absorbance of 0.306 at 240 mμ wave length.

EXAMPLE 7

10 g. of crude hexamethylenediamine containing 542 p.p.m. of cis-1,2-diaminocyclohexane and substantially no other impurity and sodium periodate of twice the mol number of the cis-1,2-diaminocyclohexane were dissolved in water. The aqueous solution was treated and distilled under a reduced pressure in the same manner as that of Example 2. A purified hexamethylenediamine was obtained in a yield of 8.71 g. It was observed that in the purified hexamethylenediamine, the content of the cis-1,2-diaminocyclohexane was lower than the sensitivity limit of the polarographic analysis and the content of the polarographically reducing impurities was 390 to 410 p.p.m. in heptaldehyde equivalent, and that the purified hexamethylenediamine had an ultraviolet ray absorbance of 0.370 at 240 mμ wave length.

EXAMPLE 8

10 g. of crude hexamethylenediamine containing 542 p.p.m. of cis-1,2-diaminocyclohexane and substantially no other impurity and potassium periodate of half the mol number of the cis-1,2-diaminocyclohexane were dissolved in water. The aqueous solution was treated and distilled under a reduced pressure in the same manner as that of Example 2. Distilled hexamethylenediamine was obtained in a yield of 8.42 g. It was observed that in the distilled hexamethylenediamine, the content of the cis-1,2-diaminocyclohexane was 150 to 170 p.p.m. by polarographic analysis and the content of the polarographically reducing impurities was 30 to 50 p.p.m. in heptaldehyde equivalent, and that the purified hexamethylenediamine had an ultraviolet ray absorbance of 0.214 at 240 mμ wave length.

Comparing the results of Example 7 with that of Example 8, it is clear that a small amount of the treating agent results in little removal of 1,2-diaminocyclohexane from the crude hexamethylenediamine. However, Example 8 shows that even when the amount of the treating agent is in the small mol ratio of 0.5 to the 1,2-diaminocyclohexane, the 1,2-diaminocyclohexane in the crude hexamethylenediamine can be removed to a considerable extent.

What we claim is:

1. A process of removing 1,2-diaminocyclohexane from crude hexamethylenediamine which has been obtained by catalytically hydrogenating adiponitrile, comprising treating said crude hexamethylenediamine containing 1,2-diaminocyclohexane with a treating agent selected from the group consisting of periodic acid, salts and mixtures of said periodic acid or periodic acid salt, the mol ratio of said treating agent to said 1,2-diaminocyclohexane in said crude hexamethylenediamine varying from 0.5 to 1.3, at a temperature up to 70° C., and distilling said treated crude hexamethylenediamine.

2. A process as claimed in claim 1, wherein said salt of periodic acid is potassium or sodium periodate.

3. A process as claimed in claim 1, wherein the mol ratio of said treating agent to said 2-diaminocyclohexane in said crude hexamethylenediamine is in the range of 0.8 to 1.3.

4. A process as claimed in claim 1, wherein said crude hexamethylenediamine is dissolved in water at a concentration of 40 to 60% by weight.

5. A process as claimed in claim 1, wherein said treatment is carried out at a temperature in the range of 20 to 40° C.

6. A process as claimed in claim 1, wherein said distillation is carried out at a temperature of 110 to 140° C. and under a reduced pressure of 35 to 120 mm. Hg.

References Cited

Chem. Abstracts, vol. 471953, pp. 4901–2.

LEWIS GOTTS, Primary Examiner

D. R. PHILLIPS, Assistant Examiner

U.S. Cl. X.R.

260—563 C, 583 D, 583 P